US006292757B1

(12) United States Patent
Flanagan et al.

(10) Patent No.: US 6,292,757 B1
(45) Date of Patent: Sep. 18, 2001

(54) METHOD AND APPARATUS FOR CONTINUOUSLY MONITORING PARAMETERS OF RECIPROCATING COMPRESSOR CYLINDERS

(75) Inventors: Edward B. Flanagan, Knoxville, TN (US); John S. Follmar, Houston, TX (US); William A. Griffith, Corryton, TN (US)

(73) Assignee: Windrock, Inc., Knoxville, TN (US)

( * ) Notice: Subject to any disclaimer, the term of this patent is extended or adjusted under 35 U.S.C. 154(b) by 0 days.

(21) Appl. No.: 09/374,978

(22) Filed: Aug. 16, 1999

(51) Int. Cl.[7] .............................. G01N 7/00; G06F 15/00
(52) U.S. Cl. ......................... 702/138; 702/33; 701/102; 73/117.3; 73/239
(58) Field of Search .................... 702/138, 56, 44, 702/85, 104, 33; 701/102, 100, 101; 73/115, 116, 117.1, 117.2, 117.3, 239

(56) References Cited

U.S. PATENT DOCUMENTS

| 4,456,963 | 6/1984 | Wiggins . |
|---|---|---|
| 4,504,920 | 3/1985 | Mickowski . |
| 4,505,152 | 3/1985 | Haddox . |
| 4,633,707 | 1/1987 | Haddox . |
| 4,676,095 | 6/1987 | Eberle et al. . |
| 4,734,869 | 3/1988 | Mickowski . |
| 4,783,990 | 11/1988 | Eberle et al. . |
| 5,058,551 | 10/1991 | Nakaniwa . |
| 5,244,357 | 9/1993 | Bauer . |
| 5,471,400 | 11/1995 | Smalley et al. . |
| 5,582,151 | 12/1996 | Wertheimer . |

Primary Examiner—Marc S. Hoff
Assistant Examiner—Hien Vo
(74) Attorney, Agent, or Firm—Pitts & Brittian, P.C.

(57) ABSTRACT

An apparatus and method for continuously monitoring selected parameters of reciprocating compressor cylinders is disclosed, the apparatus includes a plurality of sensors positioned to monitor selected parameters within the cylinder on either side of the piston, with the selected parameters including pressures on each side of the piston for each cycle, temperatures of the gas entering and exiting the cylinder, and vibrations of components such as a piston shaft within the cylinder. A calculator means in close proximity to the cylinder receives the signals from the sensors and analyzes the signals for each cycle of the piston. Output signals proportional to the monitored signals are transmitted to a remotely located computer. The output signals include pressure versus volume curves for each cylinder volume, horsepower consumed by the cylinder, inlet suction and outlet discharge gas temperatures of the gases moved through the cylinder, and compression and tension stress on the piston rod. Computer analyses compare monitored signals to preselected ranges of operating parameters to provide alarm signals to alert operators of the performance and mechanical conditions within the monitored reciprocating compressor cylinder. A method of operation for continuously monitoring selected parameters of reciprocating compressor cylinders is also disclosed.

21 Claims, 4 Drawing Sheets

METHOD AND APPARATUS FOR CONTINUOUSLY MONITORING PARAMETERS OF RECIPROCATING COMPRESSOR CYLINDERS

FIELD OF INVENTION

This invention relates to monitoring of operating parameters for compressor cylinders, and more particularly to diagnostic monitoring of operating parameters within reciprocating gas compressor cylinders.

BACKGROUND OF INVENTION

In the field of diagnostic monitoring of operating parameters within reciprocating gas compressor cylinders, it is known that if excess liquids accumulate within the piston compression chamber, the additional volume and density of liquids increases pressures and temperatures within the compression chamber with resulting increased compression and tension on the piston rod and potential self-destruction of the piston rod and piston head. It is a preference in the industry for real-time diagnostic monitoring of operating parameters so that at the initial deterioration of parameters within piston chambers, the reciprocating gas compressor pistons can be stopped before irreparable damage occurs to the cylinders, piston heads or piston rods.

Typical of the prior art are those monitoring devices disclosed in the following U.S. Patents. In U.S. Pat. No. 5,471,400, to Smalley et al., a method for detecting reciprocating compressor cylinder leaks is disclosed, the method including utilizing a computer-based control means, sensing the pressure within the operating cylinder at predetermined intervals of cylinder volume, calculating sensed pressure versus volume curves for the operating cylinder, and comparing sensed pressure versus volume curves with an ideal calculated pressure versus volume curve for a computer generated model of an ideal, non-leaking cylinder having dimensions of bore and stroke of similar size and operation as the monitored cylinder. Sensed parameters are analyzed in conjunction with ideal calculated parameters for each successive interval of crankshaft rotation. The analyzing steps include determining a course of remedial repairs to be performed on the cylinder based on probable leaks in the cylinder. Real-time modifications in the operation of the monitored cylinder are not included in the method. The method of detecting leaks does not measure or calculate the actual amount of gas entering and exiting the cylinder, nor are the entering and exiting gas amounts ratioed. The method also does not accomplish continuous monitoring for one cylinder, nor does the method simultaneous sample a plurality of diagnostic parameters from multiple cylinders, for remote real-time analyses by computers and monitoring of analyses by operators to allow for timely control of the monitored reciprocating compressor cylinders. Real-time control of compressor cylinders operating parameters is preferred to protect cylinders from self-destruction due to excess compression and tensions imposed on piston heads and piston rods due to the presence of excess temperatures or pressures created by dense liquids or gases within the cylinders.

In U.S. Pat. No. 4,456,963, to Wiggins, an apparatus and method for measuring and displaying performance characteristics of a reciprocating piston machine is disclosed, including means for providing data for crank-shaft angular position and angular velocity, means for providing data for cylinder pressure within the piston machine, and means for calculating horsepower. The means for providing data includes a pressure transducer, such as a strain gauge type of transducer, coupled to the reciprocating piston machine, and a crank angle or shaft encoder assembly for measuring crankshaft angle and piston position related events in the piston machine. A central processing unit actuated by an operator, receives data acquired by the pressure transducer and the shaft encoder assembly upon signal by an operator, with analysis by a connectable analyzer after an operator completes the hookup of the analyzer to the engine compressor. The apparatus and method of measuring requires input of information by an operator via a keyboard assembly to initialize the analyzer, with retrieval of parameters monitored by the transducers when requested by an operator. The apparatus and method of measuring allows calculation of horsepower for the tested piston and cylinder as a snapshot analysis of conditions monitored at a selected time sequence of the piston machine operation, and does not provide continuous reporting of temperatures, pressures, and volumes for one or more reciprocating compressor cylinders. The apparatus and method for measuring requires a display device such as an oscilloscope or a computer screen to view the calculated horsepower, with additional analyses attempted upon prompting by an operator via a keyboard assembly, therefore the measuring and analyses are not continuous during the operation of the piston and cylinder. Thus, if a disrupting amount of liquid enters the cylinder chamber while the transducers and analyzer are not connected or are not requested by an operator, the cylinder can self-destruct before analysis is completed by the apparatus and method of measuring.

In U.S. Pat. No. 4,783,990, to Eberle, et al., an apparatus for measuring the quantity of gas pumped by a compressor is disclosed, the apparatus including pressure sensors for measuring the external suction and external discharge gas pressures of the compressor, and a data storage means for storing data representative of the piston displacement and piston clearance. The apparatus for measuring can also include a temperature sensor means for detecting the temperature of the gas at entry and exit points in the compressor for calculating the gas throughput. A data storage means can be connected to the compressor for eventual down-loading of data by an operator when requested by an operator either by connection of the data storage means to a computer, or by remote transmission to a central storage computer. The apparatus for measuring allows calculation of the throughput of the gas, by comparison of the monitored pressures and temperatures to the manufacturer's previously calculated load curves for an ideal "as-built" piston and cylinder configuration. The apparatus for measuring does not provide for real-time measurements and reporting of pressures and temperatures for a piston and cylinder as modified by valve leaks or bore/stroke changes. The apparatus for measuring does not provide real-time calculations of compressor cylinder gas or liquid volumes, for one or a series of reciprocating compressor cylinders, without an operator's assistance. Therefore, if a disrupting amount of liquid enters one cylinder of a multi-cylinder compressor, while the pressure sensors and data storage means of the apparatus for measuring are not operating, the cylinder can self-destruct before sampling and analysis is completed and reported to an operator by the apparatus for measuring.

Therefore, it is an object of the present invention to provide a method for continuous diagnostic monitoring of operating parameters sampled within a compressor cylinder.

It is another object of the present invention to provide a monitoring apparatus for continuous diagnostic monitoring and analysis of multiple operating parameters sampled within a compressor cylinder, with timely reporting of non-specification monitored parameters.

It is another object of the present invention to provide a monitoring apparatus for continuous diagnostic monitoring and analyses of multiple operating parameters sampled within a plurality of compressor cylinders.

It is another object of the present invention to provide a method of continuous monitoring and analysis of a plurality of operating parameters within a plurality of compressor cylinders operating in concert, with timely reporting of analyzed parameters to a remote central control computer for timely display and reporting to operators of non-specification monitored parameters.

SUMMARY OF INVENTION

In accordance with the present invention, there is provided an apparatus and a method of operation for continuously monitoring selected diagnostic parameters to indicate the performance and mechanical condition of a reciprocating compressor cylinder having a double-acting piston, during operation of the compressor cylinder. The diagnostic monitoring apparatus comprises a plurality of sensors positioned to monitor selected parameters within the cylinder on either side of the piston, with a plurality of monitored signals generated by the sensors, the monitored signals being proportional to the selected parameters monitored. The selected parameters include pressures on each side of the piston head within the cylinder, temperatures of the gas entering and exiting the cylinder, and vibrations of the cylinder and piston rod. A calculator means is attachable exterior to the compressor cylinder, the calculator means receiving the monitored signals from the sensors, the calculator means analyzing the monitored signals for a plurality of operating parameters . A converter is provided in communication with the calculator means and sampling means, with generation of output signals proportional to the monitored signals from the sensors. The output signals include pressure versus volume curves for each side of the piston, horsepower consumed by the cylinder, the amounts of gas moved by the piston within the cylinder, the suction and discharge valve losses in horsepower, the inlet suction and outlet discharge temperatures of the gas moved by the piston, and the compression and tension stress on the piston rod. An electrical connector means provides for electrical communication between the plurality of sensors, the calculator means, and the converter. A transmitter means can transmit the output signals to a receiver for additional analyses including comparing the output signals to pre-determined ranges of operating parameters to provide alarm signals to alert operators.

A remotely located computer having a receiver means and a transmitter means performs additional analyses on the output signals, and compares the output signals to operator selected ranges of operating parameters to provide alarm signals to alert operators as to the performance and mechanical conditions within the reciprocating compressor cylinder. A transmitter means transmits the output signals from the converter to the receiver means of the remotely located computer, and receives alarm signals sent from the computer to the converter.

A method of operation is disclosed for continuously monitoring of selected parameters associated with performance and mechanical condition of a reciprocating compressor cylinder having a double-acting piston, comprising sensing pressure parameters on each side of the piston within the reciprocating cylinder having a repetitive cycle of operation, the pressure sensing step monitors pressures at regular angular intervals of stroke on each side of the piston during operation, and generates signals indicating the pressures on each side of the piston for each cycle of operation. An analyzing step analyzes the pressures continuously by an analysis module located in close proximity to the cylinder, with generation of pressure versus volume curves for each side of the piston during operation. A temperature sensing step measures the temperatures of gas at the inlets and outlets of each cylinder volume, the temperature sensing step generating signals indicating the temperatures of the suction and discharge gas from the cylinder, with a repetitive analyzing step occurring continuously and generating suction gas temperatures and discharge gas temperatures. The analyzed parameters are transmitted to a remotely located computer for additional steps of analyzing the pressure versus volume curves, and the gas temperatures by comparing to pre-determined operating parameters and prior generated pressure versus volume curves, and prior gas temperatures for inlets and outlets of each cylinder monitored. The computer can issue an alert signal by audio alarm and visual alarm for real-time alerting of the operators of the continuing performance and mechanical condition of each reciprocating cylinder undergoing continuous monitoring.

BRIEF DESCRIPTION OF THE DRAWINGS

The above mentioned objects and advantages of the present invention are readily apparent from description of the invention contained herein, and by reference to the claims, read together with the drawings in which:

DETAILED DESCRIPTION OF INVENTION

Figure 1:
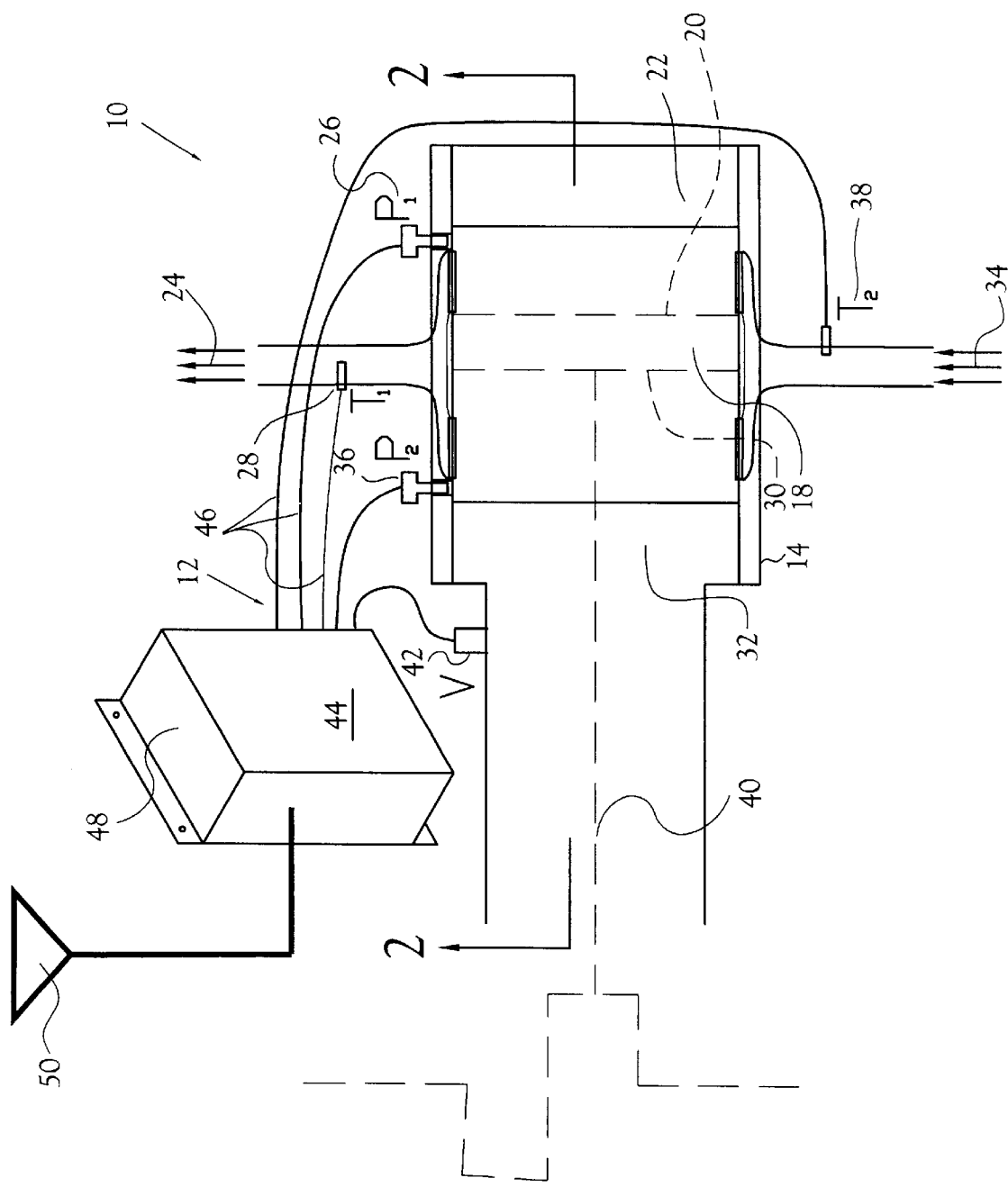
FIG. 1 is a perspective view of one embodiment of an apparatus for diagnostic monitoring for parameters of reciprocating compressor cylinders in accordance with the present invention.
Figure 2:
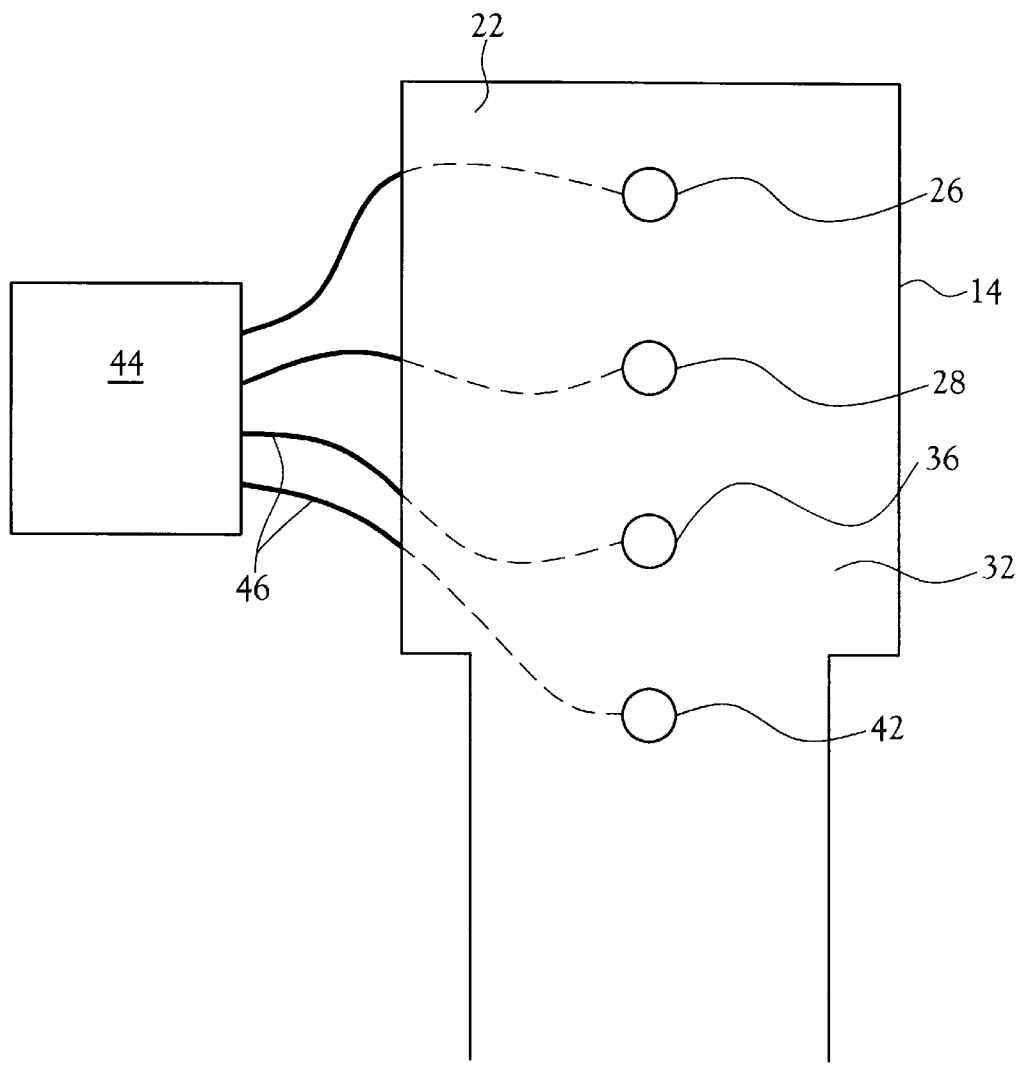
FIG. 2 is a front view, in section, of the apparatus for diagnostic monitoring taken at 2—2 of FIG. 1.
Figure 3:
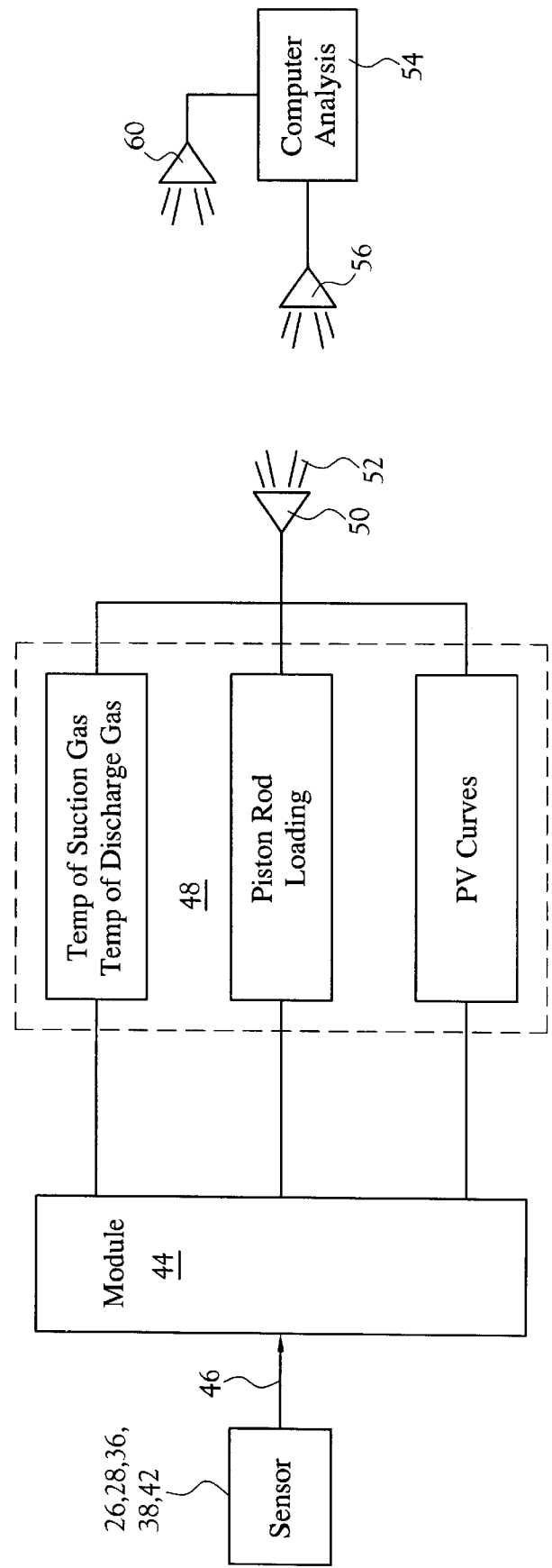
FIG. 3 is a diagram of the analysis done by the calculator means and converter module attached to the exterior of the cylinder.
Figure 4:
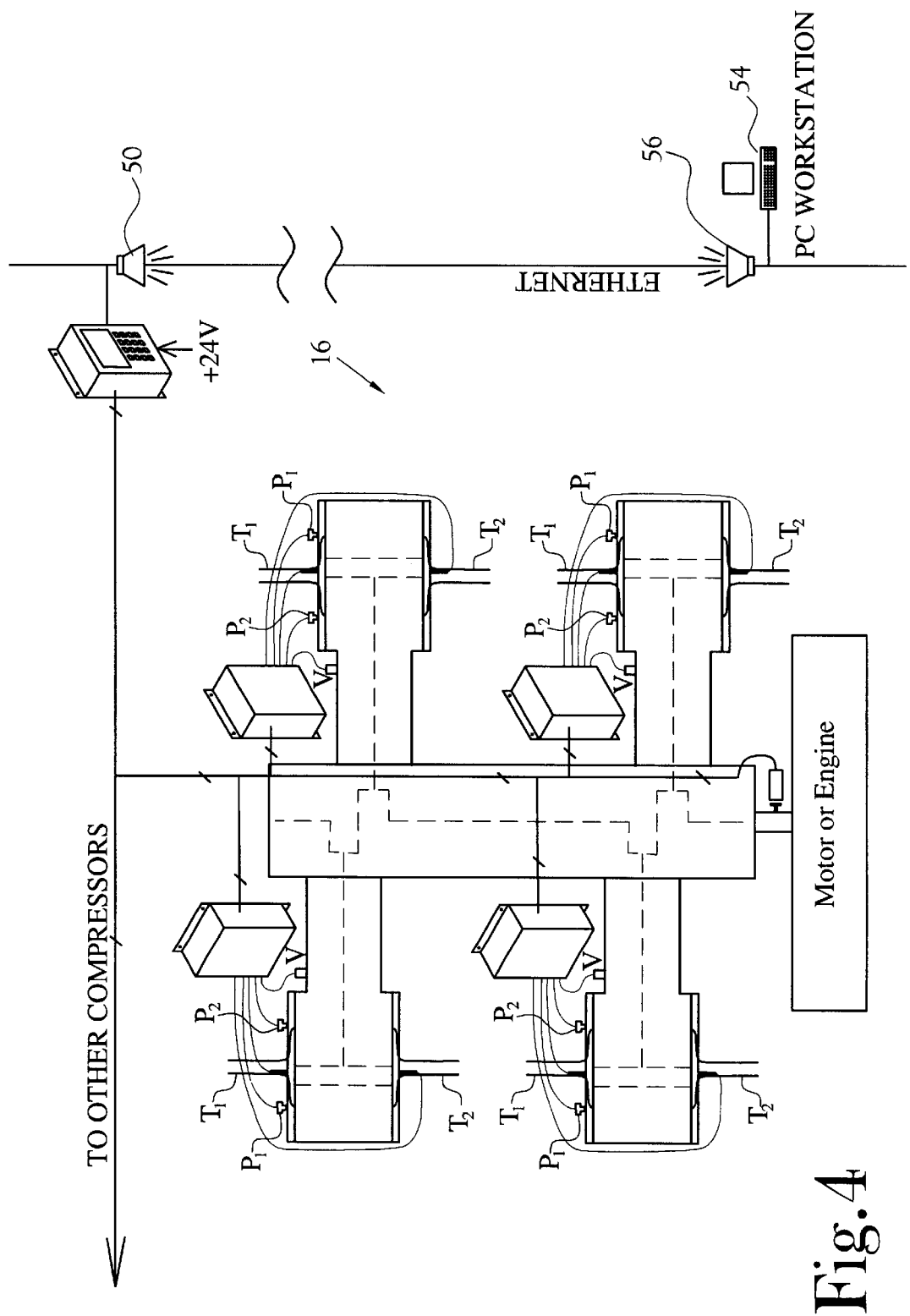
FIG. 4 is a diagram of a plurality of analysis modules connected to a plurality of cylinders and communication means between the analysis modules and a remotely located computer of the present invention.

In accordance with the present invention, there is provided a continuous monitoring system for monitoring the performance and mechanical condition of a continuously operating reciprocating compressor cylinder having a double-acting piston, incorporating various features illustrated generally in the FIGS. 1–4. In one embodiment, the continuously monitoring system 10 for diagnostic monitoring of parameters includes a plurality of sensors installed in each cylinder 14 of a plurality of reciprocating compressor cylinders 16, and a method of operation of the continuous monitoring system 10.

The main sensors for monitoring operating parameters within each reciprocating compressor cylinder 14, include at least two pressure sensors positioned on either side of the double-acting piston head 18, and at least two temperature sensors positioned at the gas inlet and outlet of the cylinder. The first pressure sensor 26, is positioned on a first side 20 of the piston head 18, the sensor extending into an inner first volume 22 of the cylinder 14, and measuring pressure $P_1$ in the first volume 22 of the cylinder 14. The second pressure sensor 36, is positioned on a second side 30 of the piston head 18, the sensor extending into an inner second volume 32 of the cylinder 14, and measuring pressure $P_2$ in the second volume 32 within the reciprocating compressor cylinder 14. The pressure sensor 26 measures internal pressure $P_1$ as the piston head first side 20 extends into the first volume 22 of cylinder 14 during the first compression segment of the piston cycle. An associated first temperature sensor 28, is attachable near one mid-point area of the cylinder 14, for measuring discharge gas temperature $T_1$ of the cylinder. Alternately, single or dual pressure and temperature sensors can be utilized with a single-acting compressor to measure compression pressures and temperatures at different locations within the cylinder on the compression side of the piston of the single-acting compressor.

The cylinder second pressure sensor 36 measures pressures $P_2$ in the cylinder second volume 32, during movement of the piston second side 30 toward the crankshaft end of cylinder 14. An associated second temperature sensor 38, is attachable near a mid-point area of the cylinder that is diametrically opposed to first temperature sensor 28, for measuring suction gas temperature $T_2$ of the cylinder. The pressure sensors 26, 36, and temperature sensors 28, 38 operate independent of an operator's intervention, and the sensors measure parameters at timed intervals during each cycle of the double-acting piston 30. The monitored parameters are transmitted by electrical connectors 46, to an analysis module 44 that can be located in close proximity to, or on the exterior of cylinder 14 for ease of upgrading or replacement.

An additional element of the invention includes a sampling means within the analysis module 44, the sampling means having a timing circuitry that triggers sampling by each of the monitoring sensors for selected parameters within the cylinder at several equally spaced intervals during a revolution of the crankshaft and/or piston shaft 40. The timing circuitry allows selected parameters to be reported at specified intervals to the analysis module 44 for calculating within the analysis module 44 of pressure versus volume curves and comparing of parameters for each cycle of the piston 18.

In another embodiment, at least one vibration detector 42 is connectable to the cylinder 14, for detection of unusual vibrations or abnormal looseness of components indicative of compression and tension stress on the piston rod 40. Additionally, a detection means to detect crankshaft angular position and crankshaft angular velocity, utilizing sensors such as crankshaft position pins or magnetic detectors 58 (see FIG. 4), can be connectable to the cylinder 16, with associated pins or magnet pickup attached to the piston shaft 40, or to the crankshaft (shown in phantom on FIGS. 1 and 4). The calculator means of the analysis module 44 can be programed and sequentially triggered to calculate performance parameters for multiple positions during the piston and crankshaft revolution cycle, while utilizing the continuously monitored pressure, temperature, and vibration signals generated by the pressure sensors 26, 36, temperature sensors 28, 38, vibration sensor 42, and/or crankshaft position detector means. A transmitter means can transmit the output signals to a receiver and second analysis module (not shown), for additional analyses including comparing the output signals to pre-determined ranges of operating parameters to provide alarm signals to alert operators when stored output signals are accessed by remote connection by an operator to the transmitter means or the second analysis module (not shown).

The analysis module 44 houses calculator circuitry, memory circuitry, timing circuitry, and converter software for receiving and storage of signals, for a plurality of instantaneous, repetitive, and cumulative mathematical calculations, and conversion of analog pressure, temperature and vibration signals, into digital output signals 50 for transmission to a remotely located computer 54. The calculator means and memory circuitry of the analysis module 44 includes thermodynamic formulas for repetitive calculations of performance parameters for each piston cycle, such as: pressure versus volume curves (PV curve not shown), horsepower for each side of the double-acting piston per each cycle, gas flow entering and gas flow leaving the cylinder (i.e. gas flow balance), percent of horsepower spent in opening suction valves and spent in opening discharge valves of the reciprocating cylinder 14, angular speed (RPM) of the crankshaft, and compression and tension forces on the piston rod 40.

Additional performance parameters can be monitored and calculated, at timed increments for each cycle, include changes in suction gas temperatures and discharge gas temperatures for a first volume exhaust port 24, and a second volume inlet port 34. The vibration detector 42 and crankshaft position detectors (not shown) allow monitoring and calculating of parameters for: cylinder vibration harmonics, crankshaft angular position, crankshaft angular velocity, and crankshaft revolutions per time. The sensor parameters for pressures, temperatures, and vibrations can be calculated by the calculator means for pre-selected timed intervals of movement of piston head 18 within cylinder 14. The pre-selected timed intervals can be set by an operator to coincide with several equally spaced intervals of movement for the crankshaft that is connected to the piston rod 40. A plurality of sensors from multiple cylinders can be electrically connected to one analysis module 44, or multiple analysis modules can be connected to one converter 48 for transmittal of output signals 52 to a computer 54 (see FIG. 4)

A plurality of monitoring sensors can provide signals for each cylinder monitored, with reporting to the analysis module for each cylinder, or the signals can be communicated to a centrally positioned analysis module that receives monitoring signals from a plurality of cylinders operating together. After calculating analyses and conversion from analog to digital signals, the output signals 50 for one or more analysis modules 44 and converters 48 can be transmitted by radio transmitter or ethernet transmissions to a remotely located central data storage and analysis computer 54 system. At the computer 54, monitored operating parameters and calculated operating ranges are continuously compared against pre-determined ranges and alert limits with alarms issued for non-specification monitored and calculated parameters. Once notified, operators can remotely control the continued operations of the one cylinder 14, or plurality of reciprocating cylinders 16, that are not operating within pre-determined ranges as determined by operators with comparisons made by the diagnostic monitoring apparatus and method of operation of the present invention.

A significant advantage of the continuously monitoring apparatus 10 and method of operation, is that actual internal pressures, suction and discharge temperatures, and other parameters such as vibration of the cylinder, and crankshaft angular position and velocity can be continuously monitored at multiple points along the reciprocating pathway of the piston. Real-time calculations are accomplished for pressure versus volume curves to indicate the horsepower utilized for each cycle of each reciprocating cylinder monitored. The calculations of parameters to determine pressure versus volume curves, and gas temperatures for each cycle, can be computed continuously with delays in reporting of calculations only due to the speed of the calculating software and the memory capacity of circuitry comparing monitored and calculated parameters to pre-determined operating parameters.

A method of operation is disclosed for continuously monitoring of selected parameters associated with performance and mechanical condition of a reciprocating compressor cylinder having a double-acting piston, comprising sensing pressure parameters on each side of the piston within the reciprocating cylinder having a repetitive cycle of operation, the pressure sensing step monitors pressures at many equally spaced intervals on each side of the piston during a cycle of operation, and generates signals indicating the pressures on each side of the piston for a cycle of operation. An analyzing step analyzes the pressures continuously by an analysis module located in close proximity to the cylinder, with generation of pressure versus volume curves for each side of the piston for each cycle of operation. A temperature sensing step measures temperatures at the gas inlet and outlet of the cylinder, the temperature sensing step generating signals indicating the temperatures of the gas entering and exiting the compressor cylinder. The steps of sensing pressure parameters and sensing temperature parameters coincide with a step of timing the steps of sensing to trigger sensing of each of the selected parameters within the cylinder at equally spaced intervals during the movement of the double-acting piston An analyzing step occurs continuously and generates suction gas temperatures and discharge gas temperatures for each cycle of operation. The analyzed parameters can be transmitted to a remote receiver for additional analyses including comparing the output signals to pre-determined ranges of operating parameters to provide alarm signals for transmission to a remotely located computer for additional steps of analyzing the pressure versus volume curves, and comparing the gas temperatures to pre-determined operating parameters. The remotely located computer can issue an alert signal by audio alarm and/or visual alarm for real-time alerting of the operators of the current performance and mechanical condition of the reciprocating cylinder undergoing continuous monitoring.

Additional steps include sensing vibration parameters of the reciprocating cylinder, the vibration sensing step includes sensing vibration frequencies, and amplitudes of the cylinder during each cycle of operation. An analyzing step calculates vibration frequencies and amplitudes of the cylinder, the analyzing step occurring continuously by the analysis module, with generation of vibration frequencies and amplitudes for the cylinder for each cycle of operation. The generated parameters are transmitted to the remotely located computer, with additional analyses, comparisons and issuing of alert signals by audio alarms and/or visual alarms from the computer when the analyzed vibration frequencies are outside the pre-determined operating parameters.

From the foregoing description, advantages will be recognized by those skilled in the art for the diagnostic monitoring apparatus for continuously monitoring selected parameters of reciprocating compressor cylinders, and method of operation. Specifically, the apparatus for diagnostic monitoring and method of operation provides the advantages of a system that continuously monitors both ends of a double-acting compressor cylinder without any user intervention, therefore the remotely located computer can receive a plurality of output signals 60 from one or more reciprocating compressor cylinders in the field without operator intervention, and can generate a complete set of performance indicators such as horsepower, gas flow, cylinder flow balance, piston rod loading, cylinder discharge pressure and temperature, cylinder suction pressure and temperature, which are calculated continuously by the remote computer without any operator intervention. The analysis module, calculator means, and converter does not require a display device for an operator to obtain the output signals since the monitored and calculated parameters can be downloaded by an operator to a hand-held storage device by attachment to a port (not shown) on the analysis module 44.

The monitored and calculated parameters can alternately be transmitted by a digital communications means to the operator's remotely located computer and central data system. The computer calculated parameters for performance (PV curves, horsepower, rod load, and flow balance), and mechanical condition of the cylinder are continuously compared by the computer against established limits from the computer and/or central data system, and alert values can be generated accordingly for alarm triggering to alert operators, and/or transmittal to the transmitter means in communication with the converter for modifications to the operations of the appropriate reciprocating compressor cylinder in the field. It is a significant benefit within the gas production and transmission industry to possess the ability to obtain in real-time, the performance and mechanical condition of a plurality of reciprocating compressor cylinders, and the ability to modify cylinder operations by limiting operations or stopping cylinders for which monitored parameters indicate that malfunction is imminent.

While a preferred embodiment is shown and described, it will be understood that it is not intended to limit the disclosure, but rather it is intended to cover all modifications and alternate methods falling within the spirit and the scope of the invention as defined in the appended claims. One skilled in the art will recognize variations and associated alternative embodiments. The foregoing description should not be limited to the description of the embodiment of the invention contained herein.

What is claimed is:

1. A diagnostic monitoring apparatus for continuously monitoring selected operating parameters to indicate to operators the performance and mechanical conditions of a reciprocating gas compressor cylinder having a double-acting piston, the apparatus comprising:

a plurality of sensors positioned to monitor selected parameters on or within the cylinder;

a plurality of monitored signals generated by said sensors, said monitored signals proportional to the selected operating parameters monitored;

sampling means attachable exterior to the compressor cylinder, said sampling means being adapted to trigger said plurality of sensors to monitor the selected operating parameters at equally spaced intervals of movement of the piston;

a converter in communication with said sampling means, said converter being adapted to generate output signals proportional to said monitored signals;

calculator means in communication with said converter, said calculator means being adapted to analyze said output signals from said converter, said calculator means adapted to compare said output signals to alert parameter ranges, said calculator means issues alarm signals if output signals are not comparable to alert parameter ranges;

a transmitter means in communication with said converter and said calculator means, said transmitter means being adapted to transmit output signals and alarm signals to a remote location; and an analysis module attachable exterior to the compressor cylinder, said analysis module contains said sampling means, said analog to digital converter, said calculator means, and said transmitter means.

2. The diagnostic monitoring apparatus of claim 1, wherein said calculator means further comprises a computer remotely located from said diagnostic monitoring apparatus, said computer having a receiver means and a transmitter means, said computer adapted to perform comparison analyses on said output signals, said computer provides viewing and reporting of comparison analyses to operators, whereby said remotely located computer performs comparison analyses of said output signals to alert operators as to the performance and mechanical conditions within the reciprocating compressor cylinder.

3. The diagnostic monitoring apparatus of claim 2, wherein said plurality of sensors further comprises at least two pressures sensors including a first pressure sensor and a second pressure sensor positioned to monitor pressures on opposing sides of the double-acting piston, each of said first and second pressure sensors generate monitored signals for transmission to said calculator means.

4. The diagnostic monitoring apparatus of claim 3, wherein said plurality of sensors further comprises at least two temperature sensors including a first temperature sensor and a second temperature sensor positioned at the inlet and outlet of the cylinder, each of said first and second temperature sensors generate monitored signals for transmission to said calculator means.

5. The diagnostic monitoring apparatus of claim 4, wherein said plurality of sensors further comprises at least one vibration sensor connectable to the cylinder and positionable to detect vibrations of the double-acting cylinder.

6. The diagnostic monitoring apparatus of claim 5, wherein said plurality of monitored signals further comprises generation of a plurality of analog signals by said sensors, said analog signals proportional to the parameters monitored by said at least two pressure sensors, said at least two temperature sensors, and said at least one vibration sensor, said plurality of analog signals communicated to said converter.

7. The diagnostic monitoring apparatus of claim 6, wherein said converter further comprises an analog-to-digital converter, said converter generates digital signals proportional to said plurality of analog signals from said sensors.

8. The diagnostic monitoring apparatus of claim 7, wherein said plurality of sensors further comprises a detection means connectable to the cylinder and positionable to detect crankshaft angular position and crankshaft angular velocity.

9. The diagnostic monitoring apparatus of claim 8, wherein said sampling means comprises a timing circuitry that triggers sampling of each of the sensors for selected parameters within the cylinder at several equally spaced intervals during the movement of the double-acting piston.

10. The diagnostic monitoring apparatus of claim 9, wherein said calculator means analyzes said monitored signals and computes performance values for each piston cycle including monitored horsepower, ratios of gas entering and exiting each side of the piston, and temperatures for inlet gas and outlet gas for the cylinder.

11. The diagnostic monitoring apparatus of claim 10, wherein said calculator means further comprises additional analyses of said output signals by comparing said output signals to pre-determined operating parameters selected by the operators, said analyses by said calculator means computes performance parameters of the cylinder, said calculator means generates alarm signals if performance parameters or output signals are outside pre-determined operating ranges selected by the operators, said calculator means transmits said alarm signals to said transmitter means.

12. A method of operation of continuously monitoring selected parameters associated with performance and mechanical condition of operation of a reciprocating gas compressor cylinder having a double-acting piston, comprising the steps of:

sensing pressure parameters on each side of the piston within the reciprocating cylinder having a repetitive cycle of operation, said pressure sensing step senses pressures at regular intervals of piston movement on each side of the piston during cycles of operation, said pressure sensing step generating monitored signals indicating the pressure on each side of the piston for cycles of operation;

analyzing said pressures of said pressure sensing step, said analyzing step occurring continuously by an analysis module located in close proximity to the cylinder, said analyzing step generating pressure versus volume curves for each side of the piston for each cycle of operation;

sensing temperatures at an inlet and an outlet of the cylinder during each cycle of operation, said temperature sensing step generating signals indicating the temperatures of the gas at the inlet and the outlet from the cylinder;

analyzing said temperatures of said temperature sensing step, said analyzing step occurring continuously and generating suction gas temperatures and discharge gas temperatures;

transmitting the generated pressure versus volume curves, and gas temperatures to a remote receiver;

analyzing the transmitted pressure versus volume curves and gas temperatures analyzing step generating alert signals for pressure versus volume curves and gas temperatures that are not comparable to pre-determined operating parameters;

issuing an alert signal from the analyzing step, and transmitting the alert signal to the remote receiver; and repeating the above steps for each cycle of the double-acting piston in the cylinder.

13. The method of claim 12, wherein the pressure sensing step and temperature sensing step further comprises:

sensing vibration parameters of the piston within the cylinder, the vibration sensing step includes sensing piston velocity and vibration frequencies of the piston within the cylinder during cycles of operation;

analyzing vibration frequencies and amplitudes of the vibration sensing step, said analyzing step occurring continuously by the analysis module, said analyzing step generating vibration frequencies and amplitudes for the cylinder for each cycle of operation; and transmitting the generated vibration frequencies and amplitudes to the remotely located computer; and issuing an alert signal from the remotely located computer when the analyzed vibration frequencies and amplitudes are outside the pre-determined operating parameters.

14. The method of claim 13, wherein the method of diagnostic monitoring is applied to a plurality of reciprocating compressor cylinders coupled by a common crankshaft, the transmitting step further comprises transmitting all generated parameters for all cylinders to the remotely located computer for analyzing and issuing alert signals by audio alarm and visual alarm for each parameter of each cylinder when the analyzed parameters and amplitudes are outside the pre-determined operating parameters.

15. The method of claim 14, wherein said steps of sensing pressure parameters and sensing temperature parameters further comprise a step of timing said steps of sensing to trigger sensing of each of the selected parameters within the cylinder at equally spaced intervals during the movement of the double-acting piston.

16. The method of claim 15, wherein said steps of analyzing pressures and temperatures further comprises a calculating step for each of the selected parameters, said calculating step generates calculated horsepower, ratios of gas entering and exiting each side of the piston, temperatures for suction gas and discharge gas for each cylinder, and the compression and tension stresses of the piston rod.

17. A method of diagnostic monitoring for continuously monitoring parameters to indicate the performance and mechanical condition of at least one remotely located reciprocating compressor cylinder having a double-acting piston, the method comprising the steps of:

sensing pressure parameters within each cylinder volume on each side of the piston for each cycle of the piston;

sensing temperature parameters at the gas inlet and gas outlet of the cylinder;

transferring the sensing parameters to a calculator means attachable exterior to the compressor cylinder;

calculating parameters of pressure versus volume curves and gas temperatures for each side of the piston for each cycle of the compressor cylinder;

converting the parameters calculated for transmission to a remote location;

providing a computer and electronic data base storage means at the remote location;

transmitting the converted parameters to the remotely located computer;

analyzing the transmitted signals by comparing the converted parameters to pre-determined operating parameters; and issuing alert signals from the remotely located computer when the analyzed parameters are outside the pre-determined operating parameters.

18. The method of diagnostic monitoring of claim 17, wherein the pressure sensing step and temperature sensing step further comprises:

sensing vibration parameters of the cylinder, the vibration sensing step includes sensing vibration frequencies and amplitudes of the cylinder during each cycle of operation;

analyzing the vibration frequencies and amplitudes of the vibration sensing step, said analyzing step occurring continuously by the analysis module, said analyzing step generating vibration frequencies and amplitudes for the cylinder for each cycle of operation;

transmitting the generated vibration frequencies and amplitudes to the remotely located computer; and issuing an alert signal from the remotely located computer when the analyzed vibration frequencies and amplitudes are outside the pre-determined operating parameters.

19. The method of claim 18, wherein the method of diagnostic monitoring is applied to a plurality of reciprocating compressor cylinders coupled by a common crankshaft, the transmitting step further comprises transmitting all generated parameters for all cylinders to the remotely located computer for analyzing and issuing alert signals by audio alarm and visual alarm for each parameter of each cylinder when the analyzed parameters are outside the pre-determined operating parameters.

20. The method of claim 19, wherein said steps of sensing pressure parameters and sensing temperature parameters further comprises a step of timing said steps of sensing to trigger sensing of each of the selected parameters within the cylinder at equally spaced intervals during the movement of the double-acting piston.

21. The method of claim 20, wherein said steps of analyzing pressures and temperatures further comprises a calculating step for each of the selected parameters, said calculating step generates calculated horsepower, ratios of gas entering and gas exiting each side of the piston, and temperatures for the inlet and outlet gas of the compressor cylinder.

* * * * *